United States Patent [19]

Grodin et al.

[11] 4,145,202

[45] Mar. 20, 1979

[54] METHOD FOR REPROCESSING GLASS FIBERS

[75] Inventors: Martin A. Grodin, Pittsburgh; Herbert W. Barch, Natrona Heights; Frank E. Harvey; Patrick C. Chardello, both of Pittsburgh, all of Pa.

[73] Assignee: PPG Industries, Inc., Pittsburgh, Pa.

[21] Appl. No.: 900,391

[22] Filed: Apr. 26, 1978

Related U.S. Application Data

[63] Continuation-in-part of Ser. No. 783,130, Mar. 31, 1977, abandoned.

[51] Int. Cl.$^2$ .................. C03B 37/00; C03B 25/00; C03C 25/00
[52] U.S. Cl. ............................ 65/2; 65/27; 65/28; 65/134; 65/335; 134/2; 134/19
[58] Field of Search ............... 65/2, 27, 28, 65, 11 R, 65/134, 335, 334; 134/2, 19, 84, 85, 89

[56] References Cited

U.S. PATENT DOCUMENTS

| 2,563,085 | 8/1951 | Utsinger | 134/2 |
|---|---|---|---|
| 2,666,720 | 1/1954 | Balz | 134/2 |
| 2,674,549 | 4/1954 | Balz | 134/2 |
| 3,155,475 | 11/1964 | Ashman | 65/2 |
| 3,253,897 | 5/1966 | Falls | 65/65 R X |
| 3,346,417 | 10/1967 | Ehrlich | 134/2 |
| 3,375,155 | 3/1968 | Adams | 65/2 X |
| 3,502,456 | 3/1970 | Fetner | 134/2 X |
| 3,503,790 | 3/1970 | Gringras | 65/27 X |
| 3,607,190 | 9/1971 | Penberthy | 65/27 X |
| 3,627,289 | 12/1971 | Erman | 134/15 |
| 3,682,666 | 8/1972 | LaCourrege | 65/27 X |
| 3,734,774 | 5/1973 | Culpepper | 134/2 |
| 3,744,779 | 7/1973 | Perry | 266/33 S |
| 3,753,743 | 8/1973 | Kakuda et al. | 65/27 X |
| 3,847,664 | 11/1974 | Gravel | 65/65 R X |
| 3,852,108 | 12/1974 | Lindburg | 134/2 |
| 3,912,534 | 10/1975 | Gurta | 134/19 |

Primary Examiner—Robert L. Lindsay, Jr.
Attorney, Agent, or Firm—John E. Curley; Alan T. McDonald

[57] ABSTRACT

A method is disclosed for processing waste glass strands and/or fibrous filaments which are produced in the course of operating a glass fiber forming plant for subsequent reuse as batch ingredients for a glass fiber forming process. The method described involves controlled thermal treatment of the waste glass strands and/or filaments to produce particulate glass which can be recycled to a fiber glass forming furnace. The reprocessing of waste glass strands and/or filaments reduces substantially the raw material cost involved in feeding glass batch ingredients to a glass fiber forming operation. Apparatus for accomplishing the reprocessing of the waste glass filaments and/or strands in accordance with the method disclosed is also described.

13 Claims, 5 Drawing Figures

GENERAL METHOD OF SCRAP RECLAMATION

METHOD FOR REPROCESSING GLASS FIBERS

REFERENCE TO CROSS-RELATED APPLICATIONS

This application is a continuation-in-part of copending application Ser. No. 783,130, filed Mar. 31, 1977 now abandoned.

BACKGROUND OF THE INVENTION

In a typical glass filament forming operation, particulate batch materials in sizes of from less than 325 to 100 mesh (U.S. sieve series) are thoroughly mixed and fed to a glass melting furnace. The molten glass issuing from the furnace is fed to a forehearth under which glass filament forming bushings are positioned. The molten glass passes from the forehearth to the bushings and is attenuated into glass filaments through bushing tips located on the bottom of the bushings. The bushings are electrically heated to maintain the molten glass contained in the bushing at the desired forming temperature. The filaments removed from the bushing are coated with a binder and/or size and then gathered into one or more unified strands. The strand or strands may then be collected as a forming package on a rotating collet, chopped into particulate strands in a chopper, attenuated by an attenuator such as a belt or wheel attenuator and passed into a containerized package or collected as a mat on a moving surface, such as a chain conveyor.

In any of the glass filament forming processes described above, a significant amount of waste strands and/or filaments is produced. Since the filaments forming the strands during the forming process have binders and/or sizes thereon, the fiber forming process produces waste strands and filaments which are coated with these materials.

Even when quality strands are being produced in the forming operation, further processing of strands to manufacture various strand products also contributes to the waste produced in a glass fiber forming plant, since these subsequent operations tend to generate waste strands. Thus, forming packages must be "end found" to make sure that the true end of the package has been located and in doing so considerable strand from a package being "end found" is discarded until the true end of the strand forming the package has been located. The wet coated strands produced in a forming operation are subsequently dried and the coating may be either under or overcured as they are dried. Strands which are out of specification after drying must be scrapped. Glass strand mats must be cut into uniform widths and mats which do not conform to manufacturing specifications are also discarded. These are typical of some of the fabricating operations which produce waste glass strands, though it will be obvious to the skilled artisan that other scrap glass strand is generated in any typical glass filament and/or strand forming manufacturing plant.

It has been estimated that 15 percent or more of the total glass filament and/or strand production of a typical glass filament and/or strand forming plant is eventually scrapped for one reason or another. This represents a significant loss of production and, since the strands and/or filaments so lost are not capable of recycle in the process, contributes substantially to the cost of producing glass filaments and/or strands. Added to this cost is the cost of disposing of the waste filaments and/or strands. Since the strands and filaments which form the waste product cannot be recycled to the glass forming furnace because they contain contaminating substances on the surface in the form of sizes, binders and/or coatings, they must be disposed of as a solid waste which is a costly operation.

Thus, while it is recognized that recycle of such filaments and/or strands to the furnace as a batch ingredient can contribute significantly to reducing waste in a glass filament and/or strand forming operation, effective methods for accomplishing this result have heretofore not been perfected. Prior to any recycling of filaments or strands to a glass forming furnace, it is necessary that the binders, coatings and/or sizes present on the product be removed from the surfaces of the filaments and/or strands. This is a complex task, since typically numerous and quite different binders and/or sizes are employed on the variety of strands and/or filaments produced by a single glass filament and/or strand production facility to tailor the strands for a particular use.

Thus, coatings or binders containing thermoset and thermoplastic resins are typically present on glass strands used in the plastic reinforcement market. Some scrap strands will contain latex coatings as well as phenolic resins for use in rubber reinforcement areas. Silane sizes are typically present on glass filaments as coupling agents while waxes, oils and other similar materials used to impart lubricity to filaments and strands during the forming and finishing operation are also found. Further, some of the waste filaments and/or strands, especially those from the glass fiber forming area, are wet when collected as waste material. Other filaments and/or strands have been dried or may even have been baked. Thus, a recycling system for waste glass filaments and/or strands must be able to accomodate the numerous and different binders, coatings and/or sizes employed on them, the water present on the product from the different stages of the production process, as well as the physical condition of the strands or filaments involved.

In U.S. Pat. No. 3,847,664 a process for removing a binder from bulk glass fiber insulation material is shown in which a gaseous mixture containing oxygen and water vapor is passed through the scrap material at a controlled elevated temperature. Control of the temperature is vital in this process to prevent fusion of the fibers caused by hot spots developing in the burning of the phenolic binder. However, this patent fails to describe a process which will effectively and thoroughly treat glass filaments and/or strands having the varied chemical compositions normally found in the binders and coatings used in the production of a variety of continuous glass strands manufactured for use in textile fabrics, plastic and rubber reinforcement.

U.S. Pat. No. 3,852,108 discloses a method for reclaiming waste glass fibers from a glass mat forming operation. Again, this patent fails to teach a method suitable for the recovery of glass fibers from the numerous and varied operations typically found in a continuous glass filament and/or strand forming plant.

The Present Invention

By virtue of the present invention, a method is disclosed which is suitable for reclaiming and recycling any of the numerous and varied types of glass filaments and/or strands produced in a continuous filament and/or strand manufacturing facility. Suitable apparatus for producing glass from fiber glass scrap for recycle to a glass fiber forming furnace is also provided.

In accordance with the method of the present invention the process may include cutting or grinding waste filaments and/or strands to suitable, processable lengths, and subsequently heating the filaments and/or strands in a controlled thermal treatment zone involving the application of several distinct temperatures to the materials undergoing treatment. In many instances the scrap glass strands may be fed to the thermal treatment zone without grinding or cutting. In the thermal treatment zone filaments and/or strands are heated initially to a temperature and for a time sufficient to remove substantially all moisture therefrom. The filaments and/or strands are then heated to a temperature and for a period of time sufficient to volatilize the organic components of the binders, coatings and/or sizes present thereon. Thermal conditions are then provided to incinerate surface materials present on the filaments and/or strands, while maintaining the glass material below its softening point. The reclaimed filaments and/or strands after the thermal treatment has been completed are then preferably subjected to a comminuting or grinding operation to reduce them in particle size to about 60 to 325 or less mesh prior to their use as feed to the furnace. It is within the purview of the invention to omit this step where the incineration step has provided particulates small enough to be fed to a furnace without further physical size reduction steps. Also included in the operation, where required, are physical separation steps for the removal of any foreign materials present, such as metal scrap and the like, which might otherwise contaminate the final glass product.

DETAILED DESCRIPTION OF THE DRAWINGS

Turning now to the Figures, the method and apparatus of the present invention will be more fully described.

Figure 1:
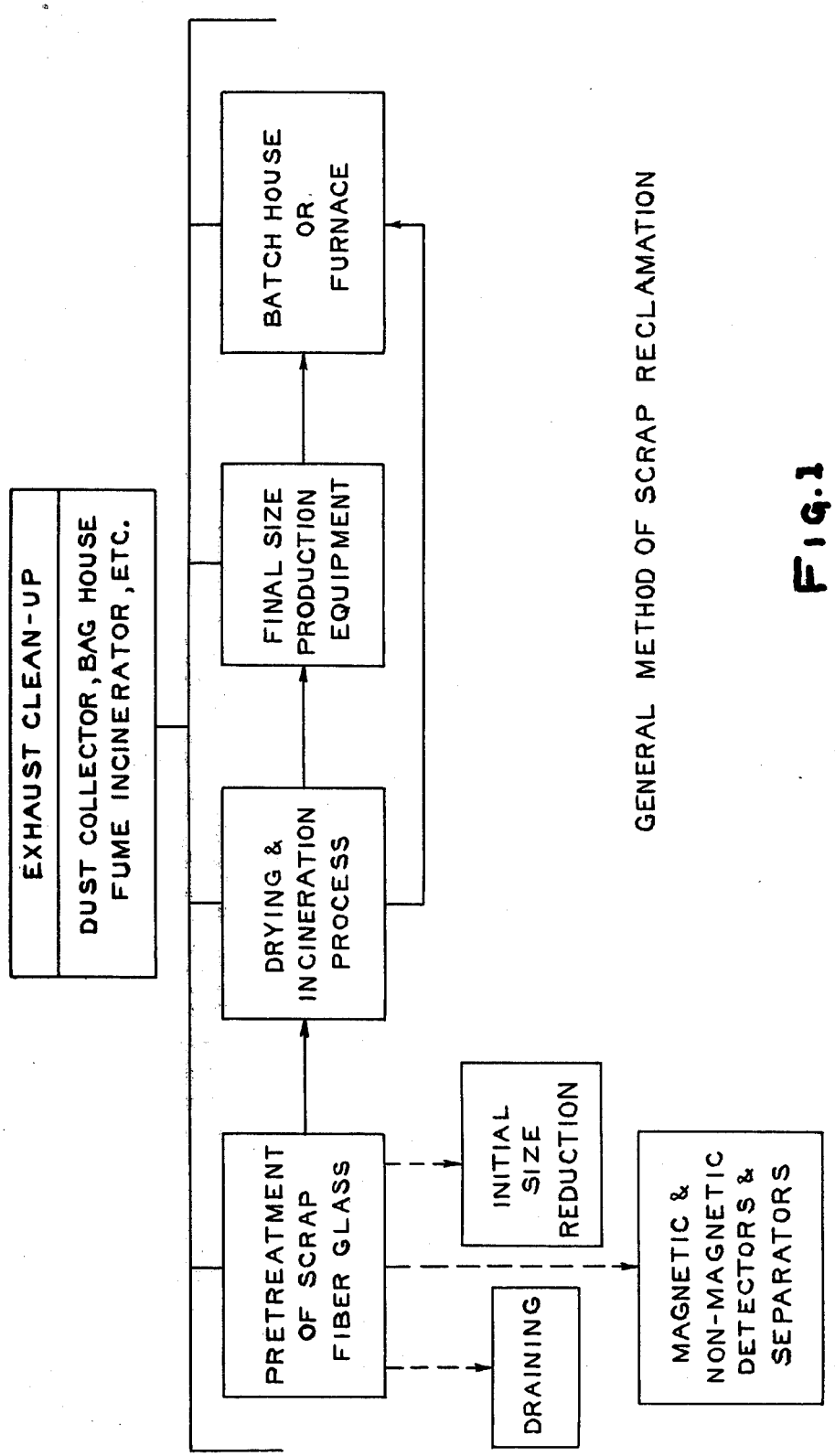
FIG. 1 is a schematic diagram of the methods employed in the practice of the present invention.

In FIG. 1 the method of the instant invention is shown in block diagram form to illustrate the process variables that may be utilized in practicing the invention. Thus, in the pretreatment of the scrap glass, recourse to all three of the pretreatment steps may be had or to none if desired. In draining the scrap as shown, it is desired to remove as much free water as possible to minimize the load on the drying step which is undertaken. Preferably the draining will be accomplished by placing the scrap glass in a suitable holding tank for a period of time to permit the free water present to be removed therefrom by gravity flow to the exterior of the zone in which the glass is held in any such vessel. The scrap glass can also be placed on a foraminous chain and conveyed from a forming area permitting the free water or aqueous solutions of binder and/or size present to fall through the foraminous chain by gravity. Where desired or possible, recourse to suction boxes on the underside of foraminous chain conveyers can be used to assist in removing water. Similar physical aids can be used where the scrap glass is held in a container or vessel for draining. In instances where the scrap glass consists primarily of dried strands and/or filaments, this draining operation is unnecessary and can be eliminated. It can also be eliminated when the drying capacity is available to handle completely wetted material and for production purposes or other reasons it is not desired to conduct a draining treatment.

The use of a metal detection and removal system is optional with the instant invention. The employment of these procedures will depend upon the quality of the scrap strand and/or filaments that the manufacturing operation is producing in a given area of the plant. Thus in a fabrication area of the plant producing a mat product where the contamination of the scrap glasses produced can be minimized or eliminated by good housekeeping practices, such a step may be unnecessary to provide good quality scrap to the thermal process constituting the invention. Similarly in an "end finding" operation scrap glass can be adequately controlled to provide high quality material needing little or no attention for the removal of foreign objects such as metal probes, forming tubes and the like. Where the scrap glass is generated primarily in a forming operation, recourse to separation techniques might be advisable and it is preferred to employ these steps in those instances. The use of conventional magnetic separators and other similar equipment will readily remove the objects found in glass strands and/or filaments from forming scrap. Essentially all that is required is that the scrap material be inspected and foreign objects, i.e., objects other than the scrap strands and or filaments, be removed before the thermal treatment. In a forming operation scrap chute these objects are typically metal knives used by forming personnel; paper forming tubes, cigarettes and the like.

It is preferred in feeding scrap glass and/or filaments to the thermal treatment zone to employ as feed glass strands and/or filaments which have been cut or otherwise reduced in size to lengths of 1 to 4 inches (2.54 to 10.16 centimeters) or more. This is particularly desirable when the thermal treatment zone is divided into physically separate compartments or where the scrap material is continuously moving through several distinct thermal treatment zones during the thermal treatment. It is however within the contemplation of the instant invention to employ bundles of scrap strands and/or filaments in the form they exist and subject them directly to the thermal treatment. In this latter form the strand and/or filaments are continuously agitated during the thermal treatment to insure that they receive thorough and adequate exposure to the thermal environment for the requisite time necessary to accomplish treatment being undertaken at a given temperature condition.

The scrap glass and/or filaments are treated in the drying and incineration zone under precise and controlled thermal environments to provide a glass product emerging therefrom that is chemically, and in some instances physically, capable of being employed as batch feed to a glass fiber forming furnace. This drying and incineration zone may be formed of a single thermal treatment unit or several. In instances where a single furnace or kiln is employed for the thermal treatment zone, the zone may be divided by different temperature regimens being maintained therein along its length or depth or the unit may be operated as a batch unit by employing different temperatures therein in stepwise timed sequence.

The important consideration in the operation of the thermal treatment zones is that the scrap glass strands and/or filaments be subjected to the requisite thermal treatments before they are removed therefrom.

Thus, scrap glass strands and/or filaments are subjected to a first thermal environment which involves holding them at temperatures typically between 200° F. to 350° F. (93.3° C. to 176.7° C.) for a period of time sufficient to drive off all free water contained on the strand. When observation indicates water is no longer being driven off from the strand, the strand is then heated to temperatures typically between 500° F. to 700° F. (260° C. to 371.1° C.) to remove the organic materials contained on the strand or filaments as coatings. This thermal treatment for removal of organic materials present involves the use of sufficient oxygen as oxygen or air to support combustion of the carbon atoms present to CO and $CO_2$ and a sufficient period of time to insure removal of the volatile organic coating materials present. Upon completion of the evolution from the thermal treatment of organic constituents from the strands and or filaments, which may be readily ascertained by observation and analysis of the gases emanating from that treatment, the glass strands and/or filaments are subjected to a final thermal treatment at elevated or incineration temperatures, typically at 900° F. to 1250° F. (482.2° C. to 676.7° C.) or higher but below the softening point of the glass to thereby remove any residues present on the glass surfaces. This treatment is for a time sufficient to insure removal of such residues. For a given quantity of glass treated the time of treatment can be selected by observing the condition of the glass with sampling at specific time increments to insure residue-free glass and selecting a specific time for a specific quantity of glass at the temperatures employed based upon such sampling.

In removing the material from the thermal treatment zone or zones the glass is physically measured by suitable sieve techniques to determine the particle size range of the glass produced. If the glass removed is inherently in the range of 60 to 325 mesh (U.S. sieve series), the material may be fed directly into a glass making furnace as cullet or fed to the batch mixing operation where it can be blended with the normal batch ingredients as feed to fiber glass furnaces. Should the particles of glass be too large in size, they may be subjected to comminution in suitable grinding equipment to reduce their size to the desired 60 to 325 mesh range.

As shown in the drawing, various methods may be utilized to remove volatile materials discharged from the thermal treatment zone and the furnace area prior to release of any gases to the atmosphere. Thus, dust collectors, such as bag houses, electrostatic precipitators and other units designed to purify gas streams may be employed to remove materials from the furnace flues and thermal treatment systems employed.

Figure 2:
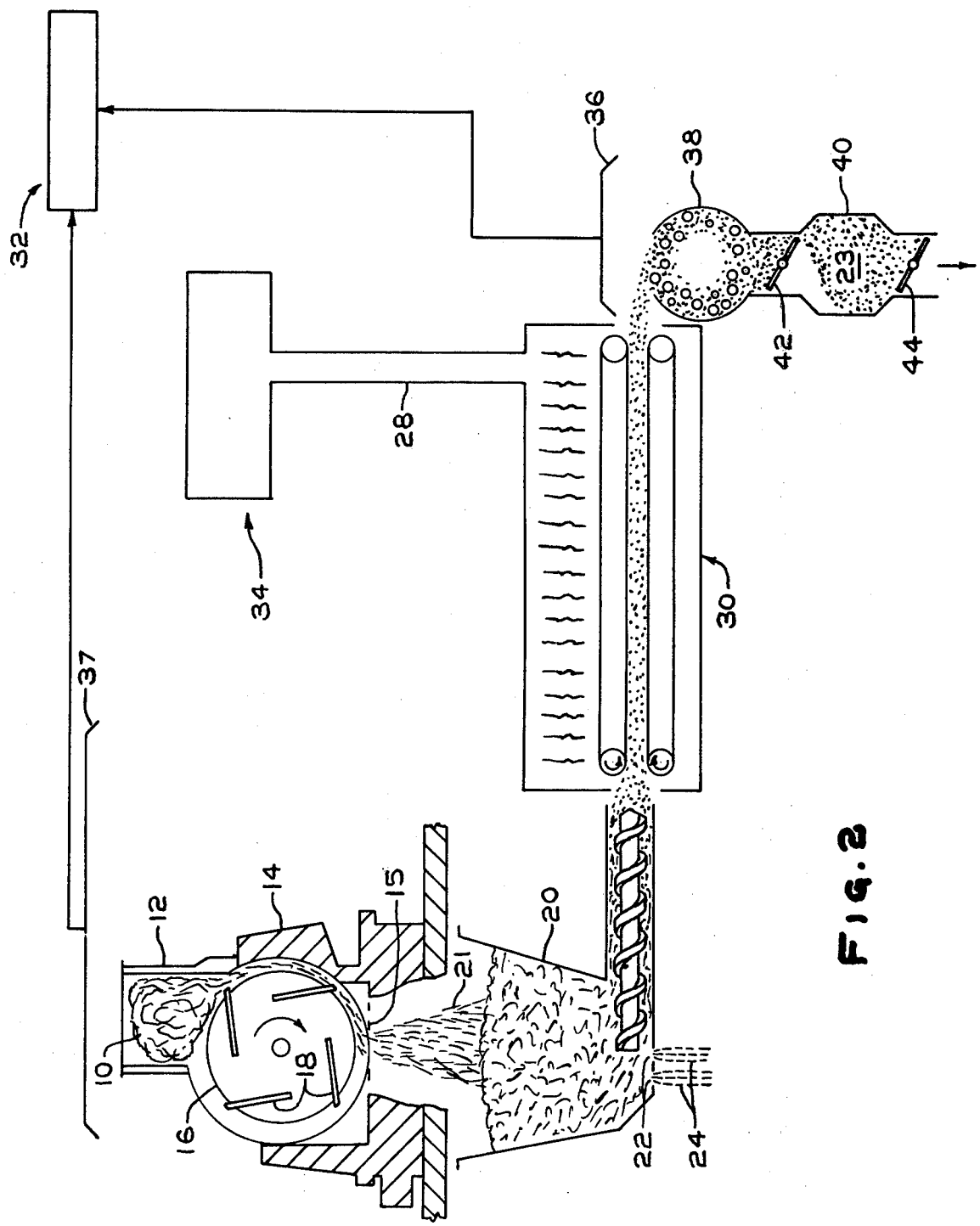
FIG. 2 diagrammatically illustrates a train of apparatus useful in performing the method of the present invention.

In FIG. 2 an apparatus train is shown which may be employed in practicing the instant invention. In the embodiment shown the process is conducted on a continuous basis and involves feeding the scrap glass strand 10 into a chute 12 at the entrance to a cutting machine 14. Cutter 14 is a commercial grinding hog which has a cylinder 16 rotating in the interior with blades 18 mounted on the periphery of the cylinder. Placement of the blades on the periphery of the cylinder at given distances from each other determines the length of the cut strands produced by the cutters. The glass strand 10 is pulled into the cutting machine by the blades 18 rotating on the cylinder 16 and are cut by the blades 18 against the interior wall of the machine 14. A screen 15 is used to permit the cut lengths of strands 21 to pass from the cutting area of the machine into a hopper 20 where they are metered continuously by screw feeder 26 into furnace 30. Ports 22 and 24 are provided in the bottom of hopper 20 for the removal of water from the wet strands 10 being fed to the cutter 14. Cutter 14 is preferably a grinding hog and Hog-Type Granulator, Model No. 3250 manufactured by Cumberland Engineering Co., Inc. is a typical device suitable for use in cutting wet strand.

The cut strands 21 from hopper 20 may be fed to a moving hearth furnace 30, as shown, and the strands are passed from one end of the furnace to the other through three distinct thermal treatment zones. Exhaust gases removed from the furnace 30 are passed to a fume incinerator 34 to burn volatile organics present prior to their release to the atmosphere.

Referring again to the oven 30, as previously mentioned this oven maintains preferably three distinct thermal treatment zones therein. It should be noted that three separate ovens, each operating at differing temperature levels, may be employed rather than a single furnace as depicted. Whether multiple furnaces or a single furnace is employed, the first zone is maintained at a temperature sufficient to dry the filaments and/or strands which enter the system with moisture present on them. Typical temperatures of this zone are from about 200° F. to about 350° F. (93.3° C. to 176.7° C.) and, preferably about 250° F. (121.1° C.).

The second zone of the oven is controlled to maintain temperatures considerably higher than the first zone. The temperatures of the second thermal zone are thus maintained sufficiently high to volatilize the organic portions of the binder and/or size on the filaments and/or strands. The temperatures within this zone may typically range from about 500° F. to about 700° F. (260° C. to 371.1° C.), and preferably about 600° F. (315.6° C.).

The final thermal stage of the oven 30 is maintained at an even higher temperature than the first or second stages. This temperature is maintained sufficient to incinerate the binder and/or size which remains on the filaments and/or strands after passing the first and second zone. Typical temperatures in this zone range from about 900° F. to 1250° F. (482.2° C. to 676.7° C.), and preferably about 1000° F. (537.8° C.).

The glass filaments and/or strands 21 leaving the oven 30 are now essentially free of binder and/or size material. The oven 30 may be directly connected to a storage facility for batch materials, such that the glass filaments and/or strands 21 emanating from the oven may be mixed directly with the other batch materials. Optionally, this material may be fed directly from the oven 30 to the glass melting furnace to be remelted and once again formed into filaments and/or strands. However, it is preferable that the filaments and/or strands 21 be further physically reduced in size, such as by grinding to an even finer particle size, to thereby decrease their melt time in the furnace. To accomplish this result, a grinding means 38, such as a cage mill, fluid energy mill or other suitable apparatus, is connected to the heating means 30, with the finely ground filaments and/or strands 23 being transported by means such as a pneumatic transporter 40 to either the batch house for raw materials or the furnace, as previously mentioned. The finely ground filaments and/or strands 23 after being subjected to the final grinding are powdery in form and preferably are in a size of from about 60 mesh to about 325 mesh or less. A typical fluid energy mill capable of producing these finely ground particles is a Model 24 Micron Master Jet Pulverizer, made by Jet Pulverizer Company.

To effectively eliminate dust and the resulting environmental problems therefrom, hoods 37 and 36 are preferably located over each of the means 14 and 38. These hoods are connected to a dust collecting means 32, such as a bag house, to effectively remove fine dust particles caused by the cutting and grinding processes.

Figure 3:
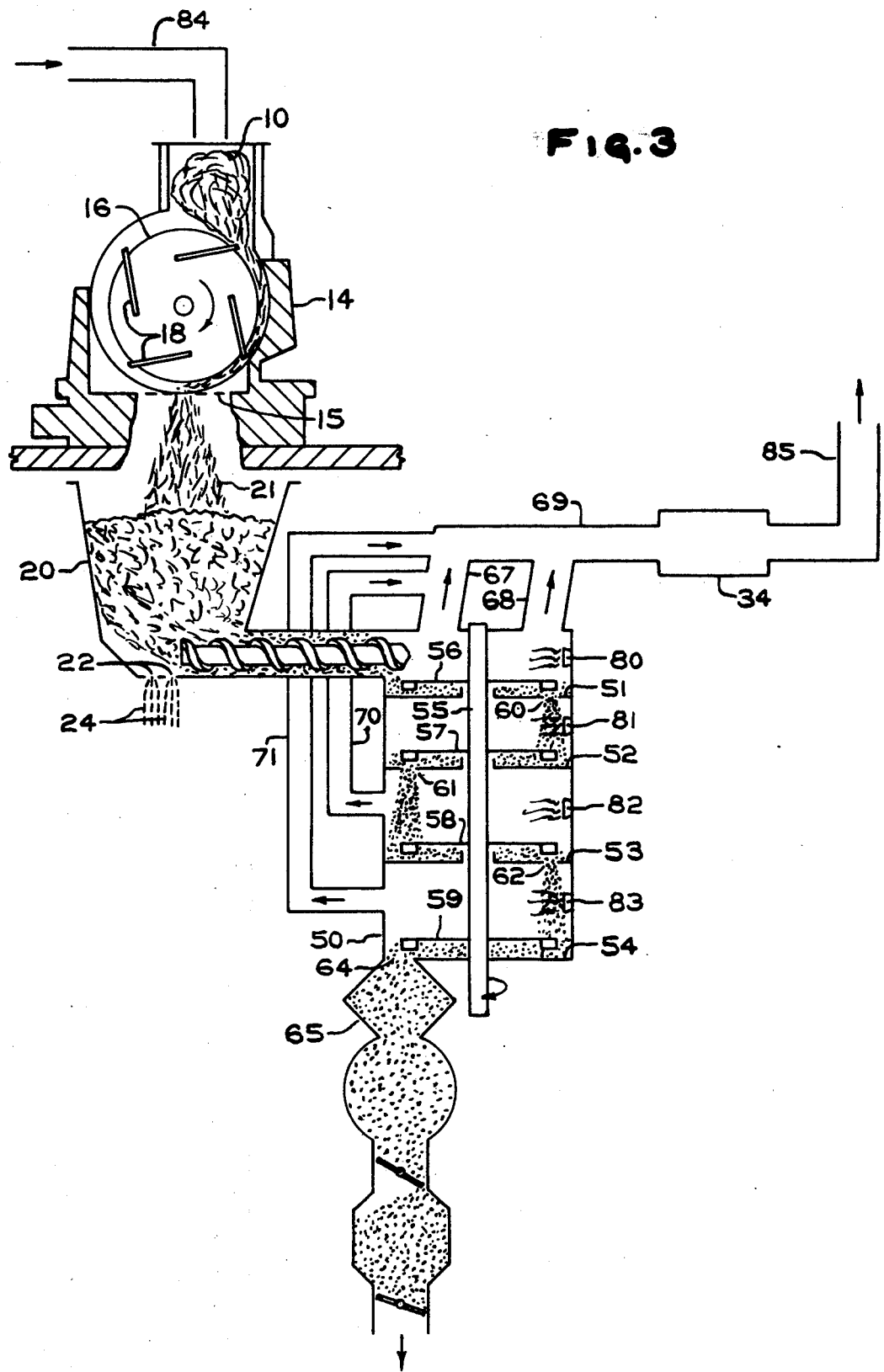
FIG. 3 shows an alternate train of apparatus suitable for use in the present invention.

FIG. 3 shows a further embodiment of the instant invention in which a vertical hearth furnace is employed in the thermal treatment zone. In this embodiment the glass strands 10 to be treated are again fed to a cutting device 14 which has a rotating cylinder 16 therein with blades 18 mounted in the periphery. The blades 18 cut the glass 10 against the inside wall of the device 14 into desired lengths and the cut strands 21 pass into the surge hopper 20 through screen 15. Hot air may be introduced in line 84 to assist in removing moisture from the strands 10.

The cut glass 21 is metered by screw conveyor 26 into a vertical hearth furnace 50 and onto the upper hearth 51. The furnace 50 can have any number of hearths and the four depicted (51, 52, 53 and 54) are for illustrative purposes only. A vertical shaft 55 is mounted in the furnace and is rotatable. Affixed to the shaft 55 are a series of plows 56, 57, 58 and 59 which move material around the surface of each of the hearths 51, 52, 53 and 54, respectively, during the thermal treatment of the cut strands 21. Openings 61, 62 and 63 are provided in hearths 51, 52 and 53, respectively, so that the thermally treated material passes continuously in a downward direction ultimately to the lower hearth 54 for removal through opening 64 which is in communication with a grinding device 65.

In the furnace 50 the strand material 21 in hearths 51 and 52 is heated to a temperature sufficient to dry the cut strands 21 and remove substantially all water therefrom. The moisture and any volatile material removed in this first zone represented by hearths 51 and 52 exit the furnace via stacks 67 and 68 to duct 69 from which they enter a fume incinerator 34. Temperatures on hearths 51 and 52 are in the range of 200° F. to about 350° F. (93.3° C. to about 176.7° C.)

The cut strands pass from hearth 52 through opening 61 onto hearth 53 where they are thermally treated to temperatures in the range of about 500° F. to 700° F. (260° C. to 371.1° C.). This thermal zone removes most of the organic coatings present on the strands and is provided with an exhaust duct 70 for removal of the hot gas to the duct 69. The material is then passed to the hearth 54 through opening 62. In hearth 54 the thermal treatment is regulated to bring the material to temperatures about 900° F. to 1250° F. (482.2° C. to 676.7° C.). This zone incinerates residual material from the surface of the strands and the hot gases pass out of this zone in exhaust duct 71 to the duct 69. All of the gas in duct 69 passes to fume incinerator 34 which burns any remaining combustibles and releases the resulting gases into stack 85.

The first thermal zone of hearths 51 and 52 is fired by burners 80 and 81, hearth 53 by burner 82 and hearth 54 by burner 83. Sufficient oxygen is provided in each of the zones to support combustion of volatiles released from the surface of the strand. A typical vertical hearth furnace suitable for use in this embodiment is a 3 foot diameter, 6 Hearth Nichols Hereshoff Furnace, made by Nichols Engineering and Research Corporation.

The completely treated material is then removed via opening 64 and may be fed to a jet pulverizer 65 in the same fashion as described above with reference to FIG. 2 or the material may be fed to a batch house without further grinding or directly to a furnace providing it is in the desired size range as it exits the furnace 50.

In a further embodiment of the instant invention it is contemplated that the processes depicted in FIGS. 2 and 3 can be carried out in batch fashion rather than as a continuous process. In such cases the need for the initial cutting stage may be eliminated and the wet strands can be fed directly to a furnace such as shown in either FIG. 2 or 3 or to a rotary kiln or other similar furnace. In this embodiment the glass strands are thermally treated using the same three temperature regimes used in the processes of FIGS. 2 and 3, but they are applied to the strand in the furnace in stages. Thus the furnace employed is charged with the total glass strand, preferably uncut but it may be cut if desired, and the strand is heated to a first temperature 200° F. to 350° F. (93.3° C. to 176.7° C.) to remove all moisture. After all moisture has been removed, the furnace and its contents are then raised in temperature to about 500° F. to 700° F. (260° C. to 371.1° C.) to remove organics from the strands. When the volatiles are removed, the furnace is then raised to about 900° F. to 1250° F. (482.2° C. to 676.7° C.) to incinerate residual surface material present on the strand. In a batch operation of this type it is preferable to agitate the material during thermal treatment to insure good heat transfer of the furnace heat to the strand especially if it was fed uncut.

EXAMPLE

According to the method of the present invention, 50,000 pounds of waste glass filaments were cut in a Cumberland Engineering grinding hog as described hereinabove, to an average length of 1.5 inch (3.81 centimerts). The ground filaments and strands were then fed to a three-stage Nichols Engineering and Research rotary kiln oven, as previously described. The first stage of the oven was maintained at approximately 300° F. (148.9° C.) to dry the filaments and strands. The second stage of the oven was maintained at a temperature of about 600° F. (3.5.6° C.) to volatilize the organic components of the coatings, binders and/or sizes on the filaments and strands. The incineration stage of the oven was maintained at a temperature of approximately 1200° F. (648.9° C.), which effectively removed substantially all of the coatings, binders and/or sizes from the filaments and strands while maintaining the glass below its softening point.

After incineration, the glass filaments and strands were transported to a Micron Master Jet Pulverizer, as previously mentioned, where they were further ground. All of the filaments and strands were ground to a nominal size such that none of the ground material was in excess of 60 mesh, with the majority of the powdery material being less than 325 mesh. The resulting pulverized filaments and strands may be fed to a glass melting furnace as part or all of the raw materials necessary for fiber production.

From the foregoing, it is obvious that the present invention provides an effective method of both reducing costs in raw materials necessary for glass filament and/or strand formation and the costs in disposing of the waste glass filaments and/or strands produced.

While the invention has been described with reference to certain specific embodiments thereof, it is not intended to be limited thereby, except as set forth in the accompanying claims.

We claim:

1. A method of treating waste glass filaments and/or strands having organic coatings present thereon comprising heating the glass filaments and/or strands in a controlled thermal environment wherein the filaments and/or strands are heated to a first thermal treatment temperature for a sufficient period of time to remove substantially all the moisture therefrom, raising the temperature of the filaments and/or strands after the moisture has been removed to a second thermal treatment temperature sufficient to volatilize the organic components of coatings present, then raising the temperature of the filaments and/or strands to a final thermal treatment temperature sufficient to incinerate any residual material on the surface thereof while maintaining the filaments and/or strands at temperatures below the softening point thereof and collecting the resulting filaments and/or strands.

2. The method of claim 1 wherein the filaments and/or strands are cut to a length of between about 1.0 and 2.0 inches (2.54 and 5.08 centimeters) prior to heating.

3. The method of claim 1 wherein the strands are heated and maintained at a temperature between about 200° F. and 350° F. (93.3° C. and 176.7° C.) in the first thermal treatment, strands are heated and maintained at a temperature of between about 500° F. and 700° F. (260° C. and 371.1° C.) in the next thermal treatment and in the final thermal stage the strand is heated and maintained at a temperature of between about 900° F. and 1250° F. (482.2° C. and 676.7° C.).

4. The method of claim 1 comprising further grinding the filaments and/or strands after they leave the thermal treatment steps.

5. The method of claim 2 wherein the glass filaments and strands are fed to the thermal treatment continuously.

6. The method of claim 3 wherein the glass strands are cut to short lengths and fed continuously to the thermal treatment.

7. The method of claim 5 wherein the filaments and/or strands collected are subjected to a grinding step.

8. The method of claim 6 wherein the filaments and or strands collected are subjected to grinding.

9. The method of claim 4 wherein said filaments and/or strands are further ground to produce a powder therefrom having particles ranging between about 60 mesh and 325 mesh or less.

10. The method of claim 1 further comprising feeding said filaments and/or strands directly to a glass melting furnace after they are collected.

11. The method of claim 4 further comprising directly feeding said filaments and/or strands to a glass melting furnace after they are further ground.

12. The method of claim 1 further comprising storing said filaments and/or strands in a batch house after they are heated.

13. The method of claim 4 further comprising storing said ground filaments and/or strands in a batch house after they are further ground.

* * * * *